(12) United States Patent
Willekens

(10) Patent No.: US 12,551,373 B2
(45) Date of Patent: Feb. 17, 2026

(54) VITRECTOMY DEVICE

(71) Applicants: UNIVERSITEIT HASSELT, Hasselt (BE); VISIONAIR BV, Geel (BE)

(72) Inventor: Koen Willekens, Geel (BE)

(73) Assignees: Visionair BV, Geel (BE); Universiteit Hasselt, Hasselt (BE)

( * ) Notice: Subject to any disclaimer, the term of this patent is extended or adjusted under 35 U.S.C. 154(b) by 204 days.

(21) Appl. No.: 18/260,431

(22) PCT Filed: Jan. 7, 2022

(86) PCT No.: PCT/EP2022/050275
§ 371 (c)(1),
(2) Date: Jul. 5, 2023

(87) PCT Pub. No.: WO2022/148842
PCT Pub. Date: Jul. 14, 2022

(65) Prior Publication Data
US 2024/0065890 A1    Feb. 29, 2024

(30) Foreign Application Priority Data
Jan. 7, 2021  (EP) ..................................... 21150592

(51) Int. Cl.
*A61F 9/007*   (2006.01)
*A61B 17/00*   (2006.01)

(52) U.S. Cl.
CPC ..................... *A61F 9/00763* (2013.01); *A61B 2017/00544* (2013.01); *A61B 2217/005* (2013.01)

(58) Field of Classification Search
CPC .. A61F 9/007; A61F 9/00736; A61F 9/00754; A61F 9/00763; A61B 17/32; A61B 17/32002; A61B 17/320783; A61B 2017/00544; A61B 2017/320028; A61B 2017/320032; A61B 2017/320064; A61B 2217/005; A61B 10/0275
See application file for complete search history.

(56) References Cited

U.S. PATENT DOCUMENTS

| | | | |
|---|---|---|---|
| 4,811,734 A | 3/1989 | McGurk-Burleson et al. | |
| 2012/0283741 A1* | 11/2012 | Luloh | A61F 9/00763 606/107 |
| 2013/0211439 A1* | 8/2013 | Geuder | A61B 17/32002 606/171 |
| 2014/0171997 A1 | 6/2014 | Nissan et al. | |

(Continued)

FOREIGN PATENT DOCUMENTS

| DE | 102017221017 A1 | 5/2019 |
|---|---|---|
| ES | 2777881 A1 | 8/2020 |

(Continued)

OTHER PUBLICATIONS

International Search Report and Written Opinion mailed Apr. 4, 2022, in reference to co-pending European Application No. PCT/EP2022/050275 filed Jan. 7, 2022.

*Primary Examiner* — Robert A Lynch
(74) *Attorney, Agent, or Firm* — DINSMORE & SHOHL LLP

(57) ABSTRACT

The present invention relates to ophthalmic surgical devices, systems, and methods, in particular to vitrectomy device with a rotating inner tube.

16 Claims, 6 Drawing Sheets

(56) References Cited

U.S. PATENT DOCUMENTS

2015/0182379 A1* 7/2015 Fantoni ............... A61F 9/00763
                                                          606/171
2017/0333252 A1  11/2017 Biancalana et al.
2019/0314201 A1* 10/2019 Paydar ................ A61F 9/00763

FOREIGN PATENT DOCUMENTS

| GB | 2222953 A | 3/1990 |
|----|-----------|--------|
| WO | 2013009576 A1 | 1/2013 |
| WO | 2018178804 A1 | 10/2018 |

* cited by examiner

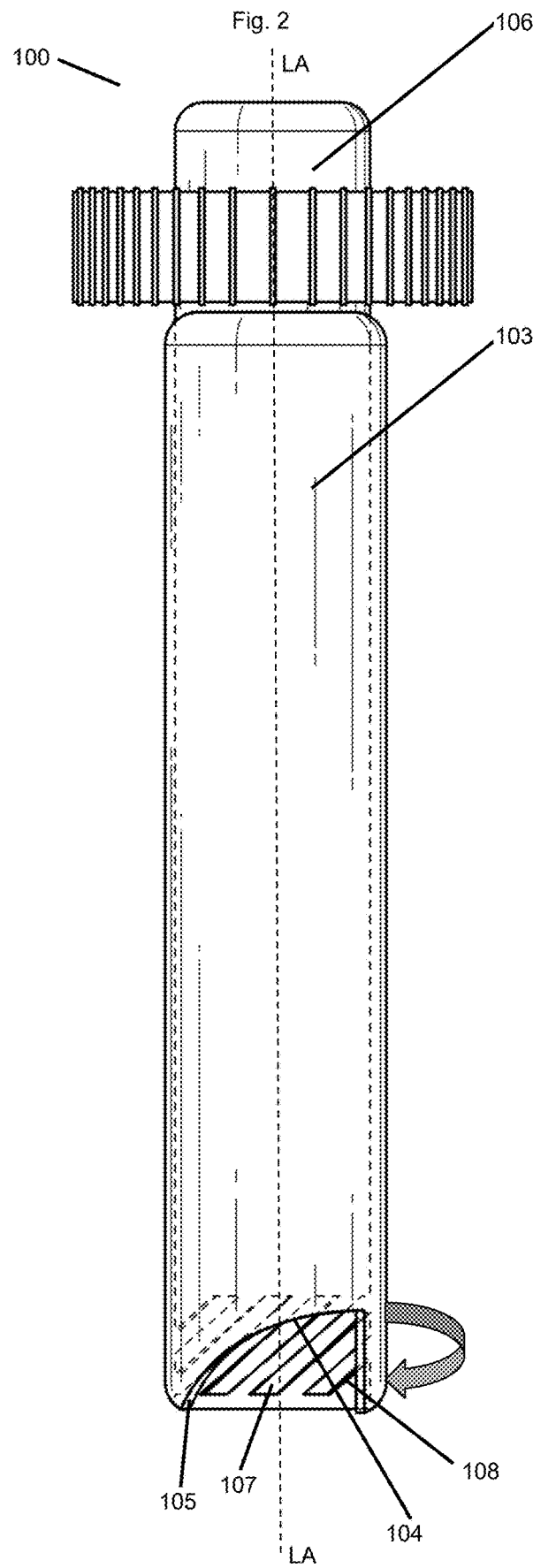

Fig. 3A
Fig. 3B
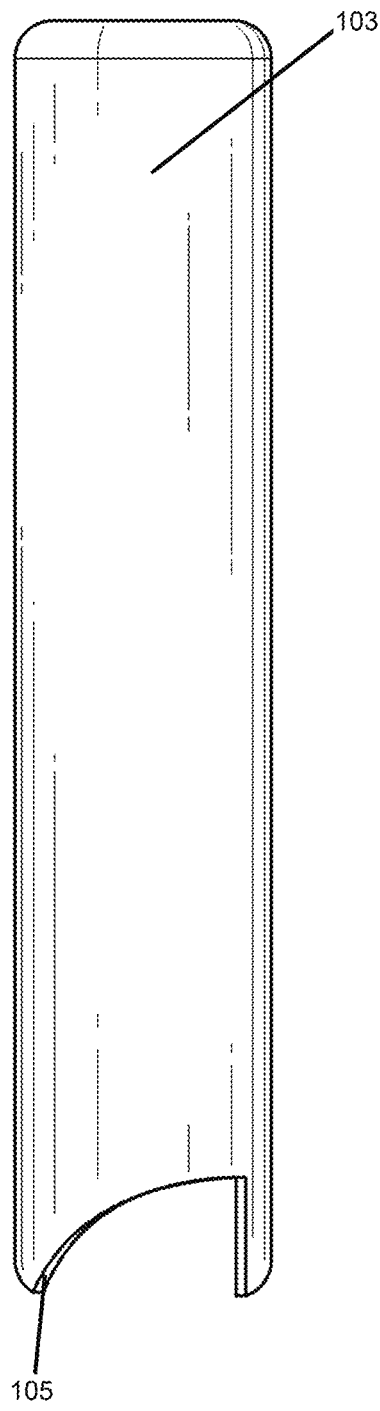
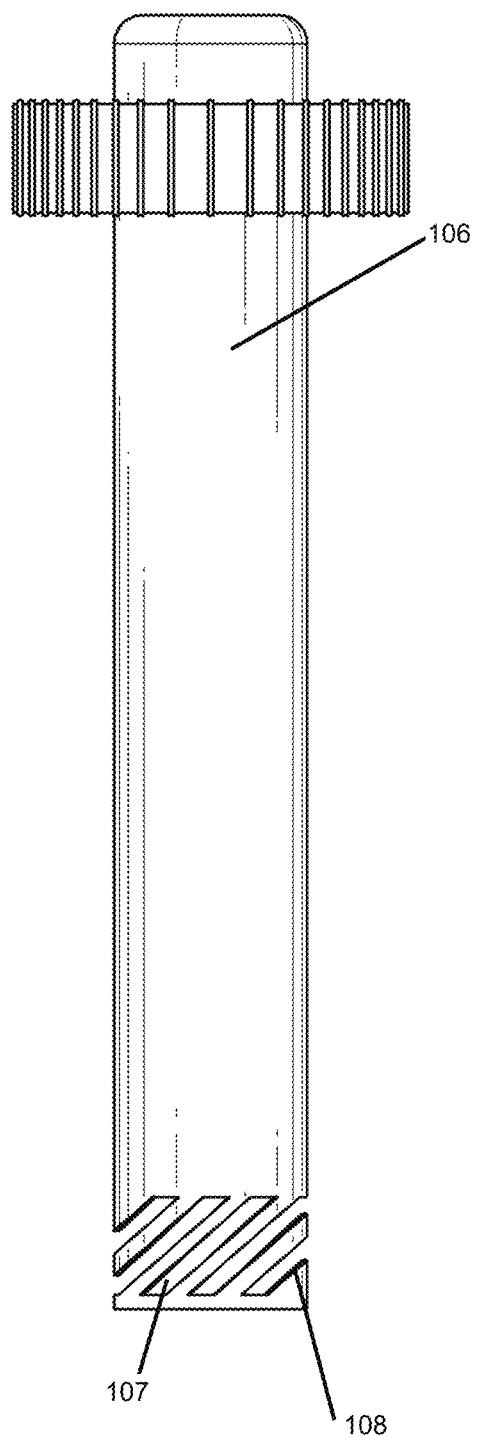

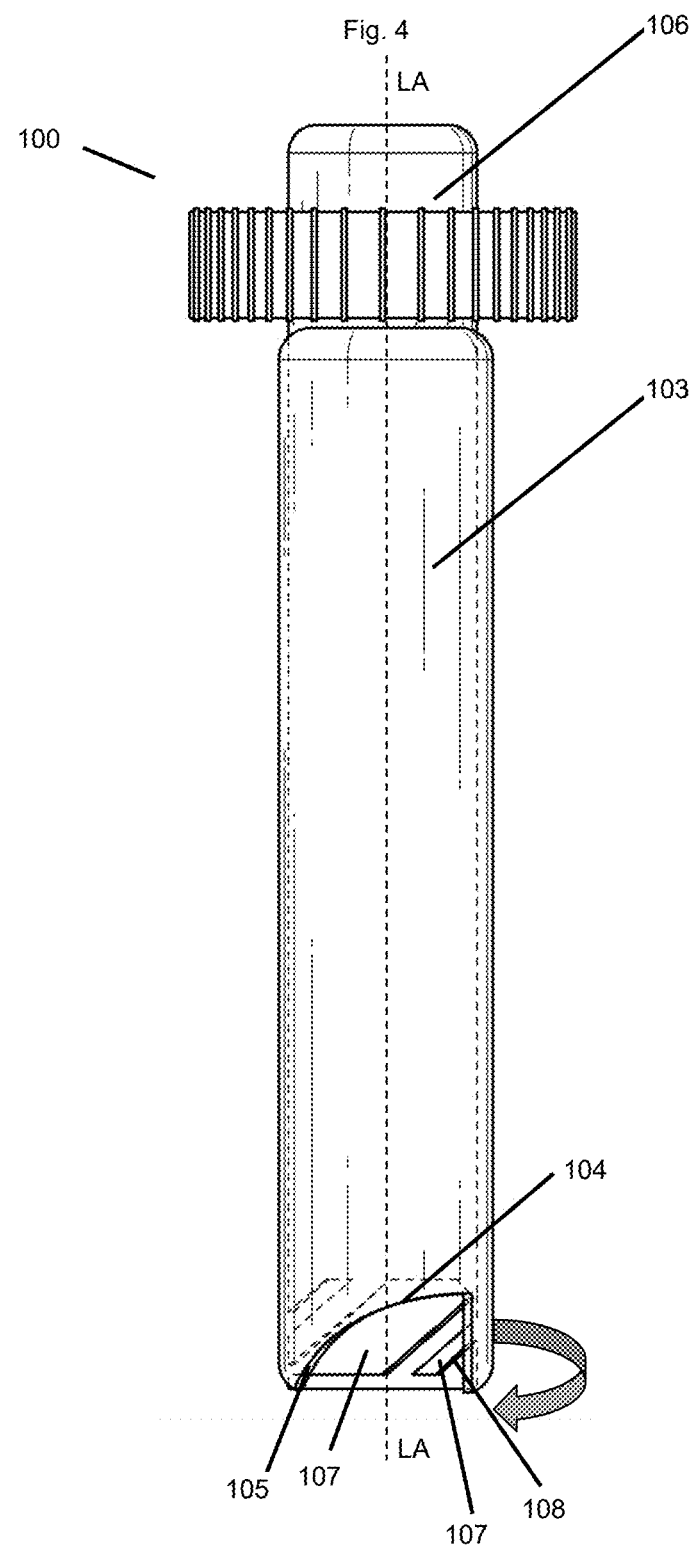

VITRECTOMY DEVICE

CROSS REFERENCES TO RELATED APPLICATIONS

This application is a national-stage application under 35 U.S.C. § 371 of International Application No. PCT/EP2022/050275, filed Jan. 7, 2022, which International Application claims benefit of priority to European Patent Application No. 21150592.0, filed Jan. 7, 2021.

FIELD OF THE INVENTION

The present invention relates to ophthalmic surgical devices, systems, and methods, in particular to vitrectomy device with a rotating inner tube.

BACKGROUND TO THE INVENTION

Microsurgical procedures frequently require precision cutting and/or removing of various body tissues.

Currently vitrectomy devices are made of an immobile outer tube with an opening on the side and an inner tube that moves up and down working as a guillotine knife to cut the vitreous (vertical cutters). The innertube movement is typically a pneumatically driven spring-return system and maximal cutting speeds of about 10.000 cuts per minute can be obtained with this technology. Lately, dual cutting ports have been invented, effectively doubling cutting speed and maintaining a 100% open duty cycle (opening of the cutter port) increasing flow capacity and decreasing particle size of the vitreous material. This however does not suffices to perform a traction free vitrectomy.

WO2018011699 discloses systems, apparatuses, and methods of and for an ophthalmic surgical system. An ophthalmic surgical system may include a vitrectomy probe having a housing sized and shaped for grasping by a user. The vitrectomy probe may also include a cutter extending from the housing and being sized to penetrate and treat a patient eye. The cutter may include an outer cutting tube coupled to the housing. The outer cutting tube may have an outer port formed therein that is sized and shaped to receive tissue. The cutter may include a rotatable inner cutting member disposed within the outer cutting tube. The inner cutting member may include a first cutting surface that rotates across the outer port to cut the tissue when the inner cutting member is rotated. The vitrectomy probe may include a pneumatic vane actuator positioned within the housing and configured to rotate the inner cutting member.

A disadvantage of this invention is that the device is used only for cutting or aspiration and excludes multifunctional use.

WO2018178804 discloses vitrectomy probes and methods related thereto are disclosed herein. The disclosure describes various example vitrectomy probes having a rotational helical cutter. An example helical cutter includes an outer cutter portion and an inner cutter portion received therewithin. The inner cutter portion is operable to rotationally reciprocate within the outer cutter portion about a longitudinal axis thereof. A helical shearing surface formed at a distal end of the inner cutter portion is operable to sever material entering the cutter via a port formed in the outer cutter portion.

A disadvantage of this invention is that the device is used only for cutting or aspiration and excludes multifunctional use.

In conclusion, there is a continuous need in a multifunctional device, which can make the time of the vitrectomy operation shorter.

SUMMARY OF THE INVENTION

The present invention provides for a vitrectomy device comprising a housing and a cutter, wherein the cutter comprising an outer tube coupled to the housing, an inner tube disposed within the outer tube, the inner tube is rotatable about a longitudinal axis thereof, a drive system positioned within the housing is coupled to the inner tube and configured to rotate the inner tube, the inner tube comprises at least one opening with at least one cutting edge at the wall of the inner tube at the distal end of said inner tube, the outer tube comprises an opening with a cutting edge at the wall of the outer tube at the distal end of said outer tube, characterized in that the inner tube comprises a plurality of openings with a plurality of cutting edges at the wall of the inner tube at the distal end of said inner tube, the cutting edges of the inner tube and the cutting edge of the outer tube are configured to form an angle with respect to one another by rotation of the inner tube.

In an embodiment, the inner tube has a plurality of cutting edges spaced from one another, configured to create a variable open surface opening during rotation in the overlap between the opening of the outer tube and the plurality of openings of the inner tube.

In another embodiment, the inner tube is configured to create contact between the cutting edges of the outer tube and the cutting edges of the inner tube at any time during the rotation of the inner tube.

In a next embodiment, the variable open surface of opening is between 50-150% of a diameter of the outer tube.

In a further embodiment, the drive system of the cutter of the vitrectomy device comprises a motor, a drive shaft and a revolving cylinder.

In some embodiments, the inner tube is removable.

In another embodiment, the revolving cylinder of the drive system of the cutter comprises multiple chambers, wherein at least one of said chambers holds the inner tube.

In a further embodiment, the revolving cylinder of the drive system of the cutter may further comprise a vitrectomy tool selected from a flute needle, a soft tipped needle/retinal dyes/intra-ocular medication.

In yet another embodiment, the motor is selected from a pneumatically driven sterilizable air-motor with high-speed rotation of at least 80.000 rpm or an electric motor with high-speed rotation of at least 80.000 rpm.

In a next embodiment, the outer tube is open at the distal end.

In another embodiment, at least one cutting edge of the opening of the inner tube is vertical.

In a following embodiment, at least one cutting edge of the opening of the inner tube is oblique.

The opening of the outer tube is not restricted to a particular shape. In a further embodiment, the opening of the outer tube is substantially (semi)-circular. In a particular embodiment the cutting edge of the opening of the outer tube is substantially (semi)-circular.

In yet a further embodiment, the inner tube is configured as an aspiration passageway arranged to aspirate tissue from the eye.

In a next embodiment, the present invention provides a method of a vitrectomy using a vitrectomy device according to any one of the previous claims comprising the steps of inserting the vitrectomy device into a vitreous cavity of the eye;

turning-on a drive system of the cutter of the vitrectomy device to rotate the inner tube of the cutter of the vitrectomy device;

cutting the vitreous material by the cutter, removing vitreous material from said vitreous cavity by aspiration;

characterized in that the cutting is achieved by an angle formed between the cutting edges of the inner tube and the cutting edge of the outer tube.

In an embodiment, the inner tube has a plurality of cutting edges spaced from one another, creating a variable aspiration space, i.e. creating a variable open surface opening, during rotation in the overlap between the opening of the outer tube and at least one opening of the inner tube.

BRIEF DESCRIPTION OF THE DRAWINGS

FIG. 2 is a side view of a vitrectomy device, according to an embodiment of the present invention.

FIG. 3A is a side view of an outer tube of a vitrectomy device, according to an embodiment of the present invention.

FIG. 3B is a side view of an inner tube of a vitrectomy device, according to an embodiment of the present invention.

FIG. 4 is a side view of a vitrectomy device, according to an embodiment of the present invention.

DETAILED DESCRIPTION OF THE INVENTION

Figure 1:
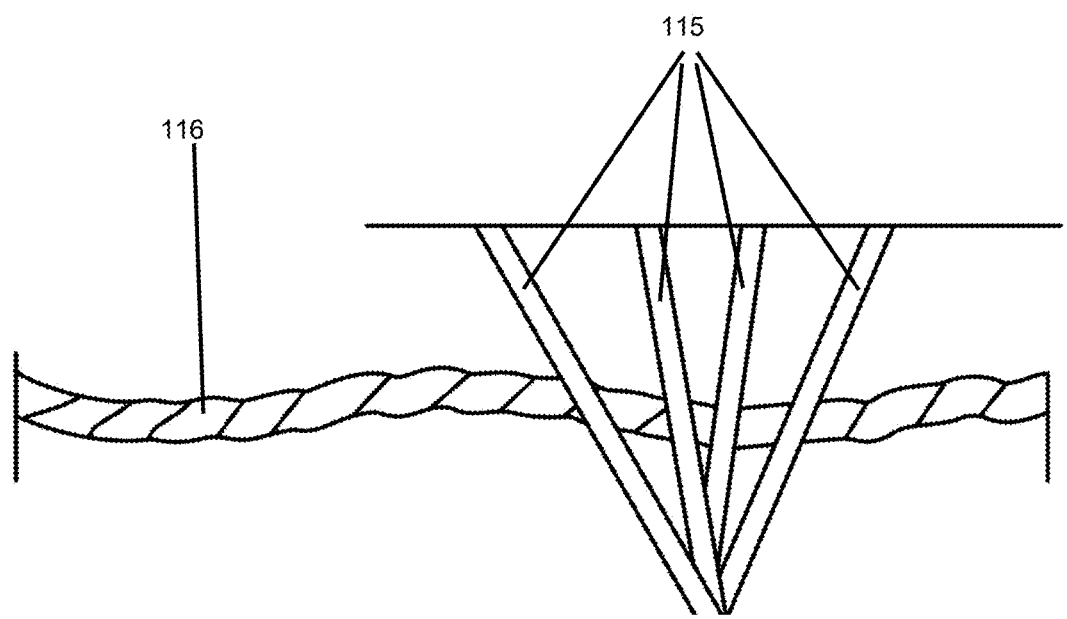
FIG. 1a is a side view of a schematic representation of the direction of the incisions of the vitreous material.

The present invention will be described with respect to particular embodiments and with reference to certain drawings, but the invention is not limited thereto. The drawings, as further described, are only schematic and non-limiting. In the drawings, some of the elements may not be drawn to scale for illustrative purposes. The dimensions and the relative dimensions do not correspond to the actual reductions to practice of the invention.

Furthermore, the terms first, second, further and the like in the description and in the claims are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a product comprising A and B" should not be limited to devices consisting only of components A and B. It means that with respect to the present invention, the relevant components of the product are A and B, and that further components such as C may be present.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein and unless otherwise specified, the term "distal end" is to be understood as the end located away from the center of the device along a longitudinal axis of said device. The term "distal" can be generally understood in the field to mean away from the surgeon's side of the apparatus and close to the patient's side.

As used herein and unless otherwise specified, the term "revolving" is to be understood as something that moves around a longitudinal axis thereof.

As used herein and unless otherwise specified, the term "removable" is to be understood as something that can easily be moved from its place or position.

As used herein and unless otherwise specified, the term "drive system" is to be understood as a system that drives the internal parts of a vitrectomy device, e.g. gives rotation to revolving cylinder and/or the inner tube.

It is an advantage of embodiments of the current invention that different types vitrectomy tools may be used in one vitrectomy device to perform not only cutting but also other vitrectomy procedures, what increases the speed of the vitrectomy operation.

It is yet a further advantage of embodiments of the current invention that cutting edge is constantly active due to the respective configuration and the location of the cutting edges of the inner and the outer tubes.

It is also an advantage of embodiments of the current invention that due to the fast and constant cutting, the size of the cut vitreous particles is reduced and the vitreous loses the properties of a non-Newtonian fluid, which also significantly increases the aspiration rate.

It is also an advantage of embodiments of the current invention that the vitrectomy device has a continuous open aspiration port due to the respective configuration and the location of the cutting edges of the inner and the outer tubes.

We now refer to FIG. 1, showing a side view of a schematic representation of the direction of the cuts 115 of the vitreous material, represented schematically in the form of fibers 116. This figure clearly shows that the vitreous material is not cut along the fiber 116, as when using vertical cutters with horizontal cutting edges, and not across the fiber 116, as when using rotary cutters with vertical cutting edges, but the cut 115 extends at an angle to the surface of the fiber 116 in several places (locations).

We now refer to FIG. 2, showing a side view of a vitrectomy device 100, according to an embodiment of the present invention. This figure clearly shows that the vitrectomy device 100 comprises an outer tube 103 and an inner tube 106 (indicated also by a dotted line) with openings at their walls. In this example, the outer tube 103 has an opening 104 at its distal end. Preferably, the outer tube 103 has the opening 104 at its wall and is closed at its end. Alternatively, the outer tube 103 can be open at its end. Preferably, the shape of the opening 104 is at least substantially semi-circular and the cutting edge 105 of the outer tube 103 is also at least substantially semi-circular. Alternatively, the opening 104 can be substantially circular. Alternatively, the cutting edge 105 can be also substantially circular. Unless provided otherwise, the term "semi-circular" should be understood as an object or arrangement of objects in the form of a half circle. For example, when a circle is cut into two halves or when the circumference of a circle is divided by 2, we get semi-circular shape. As used herein, the term "(semi)-circular" is meant to include both semi-circular and circular arrangements. Substantially semi-circular and substantially circular, indicates that the shape is not restricted to semi-circles or circles but includes any overall round—semi-round shape, such as an (semi)-oval, (semi)-egg shape, (semi)-ellipsoid, and the like.

The inner tube 106 comprises a plurality of openings 107 with a plurality of cutting edges 108 at the wall of the inner tube 106 at the distal end of said inner tube 106. Preferably, the inner tube 106 is closed at the distal end. Preferably, the cutting edges 108 of the openings 107 of the rotating inner tube 106 are oblique with respect to the longitudinal axis LA of said inner tube.

FIG. 3A illustrates a separate side view of an outer tube 103 of a vitrectomy device 100 with a semi-circular cutting edge 105, according to an embodiment of the present invention.

FIG. 3B illustrates a separate side view of an inner tube 103 of a vitrectomy device 100, according to an embodiment of the present invention. This figure clearly shows that the inner tube comprises a plurality of openings 107 with a plurality of cutting edges 108 at the wall of the inner tube 106.

We now refer to FIG. 4, showing a side view of a vitrectomy device 100, according to an embodiment of the present invention. This figure clearly shows that the vitrectomy device 100 comprises an outer tube 103 and an inner tube 106 (indicated also by a dotted line) with openings at their walls. In this example, the outer tube 103 has an opening 104 at its distal end. The opening 104 is semi-circular and the cutting edge 105 of the outer tube 103 is also semi-circular. The inner tube comprises a plurality of openings 107 with a plurality of cutting edges 108 at the wall of the inner tube 106 at the distal end of said inner tube 106. The opening 107 between the cutting edges 108 can be of different widths. The theoretical advantage of this embodiment is that by aligning the largest opening 107 of the inner tube 106 with the opening 104 in the outer tube 103, a larger flow rate can be achieved by merely applying suction without cutting. Preferably, the inner tube 106 is closed at the distal end. Preferably, the cutting edge 108 of the opening 107 of the rotating inner tube 106 is oblique with respect to the longitudinal axis (LA) of said inner tube.

Figure 5:
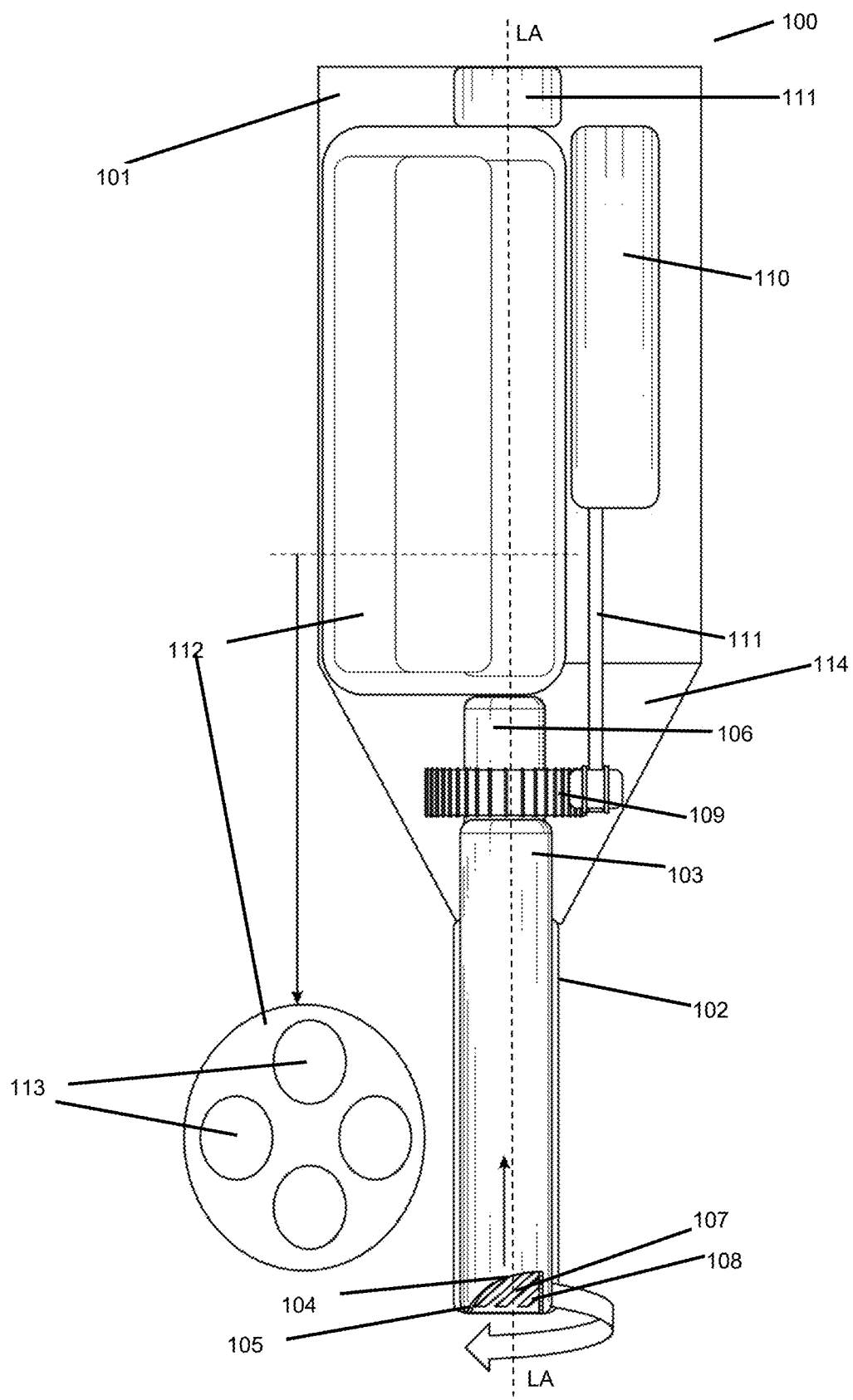
FIG. 5 is a side view of a vitrectomy device, according to an embodiment of the present invention.

We now refer to FIG. 5, showing a side view of a vitrectomy device 100, according to an embodiment of the present invention. This figure clearly shows that the vitrectomy device 100 comprises a housing 101, that is sized and shaped for grasping by a hand of a user, and a cutter 102, configured for insertion into the eye of a patient. The cutter 102 extends from a distal portion 114 of the housing 101 along a longitudinal axis (LA). The cutter 102 comprises an outer tube 103 coupled to and extending from the housing 101. The outer tube 103 has an opening 104 on the wall at the distal end. In this example, the outer tube 103 is complete open at the distal end. Preferably, the outer tube 103 is closed at the distal end. The cutter 102 comprises further an inner tube 106 disposed within the outer tube 103, the inner tube 106 is rotatable about a longitudinal axis thereof, which in this implementation, is coaxial with the longitudinal axis LA. The inner tube 106 and outer tube 103 fit together tightly. The inner tube 106 comprises at least one opening 107 with at least one cutting edge 108 at the wall of the inner tube 106 at the distal end of said inner tube 106. In this example, the inner tube 106 comprises a plurality of openings 107 with a plurality of cutting edges 108 at the wall of the inner tube 106 at the distal end of said inner tube 106. Preferably, the plurality cutting edges 108 of the inner tube 106 are spaced from one another. Preferably, the inner tube 106 is configured to create a variable open surface of the opening 104 during rotation in the overlap between the opening 104 of the outer tube 103 and the plurality of openings 107 of the inner tube 106. Preferably, at least one cutting edge 108 of the opening 107 of the rotating inner tube 106 may be vertical, i.e. along or oblique with respect to the longitudinal axis of the inner tube Alternatively all of the cutting edges 108 of the plurality of openings 107 of the rotating inner tube 106 may be parallel with one another, along or oblique with respect to the longitudinal axis of the inner tube. Alternatively, at least one cutting edge 108 of the opening 107 of the rotating inner tube 106 may be slightly curved, i.e. smoothly rounded with respect to the longitudinal axis of the inner tube. Alternatively, all of the cutting edges 108 of the plurality of openings 107 of the rotating inner tube 106 may be slightly curved, i.e. smoothly rounded with respect to the longitudinal axis of the inner tube, in particular in a parallel orientation to one another. Said vertical and/or slightly curved orientations of the cutting edges 108 of the openings 107 of the rotating inner tube 106 improve the cutting movement. In this example, the plurality of the cutting edges 108 of the opening 107 of the inner tube 106 is oblique with respect to the longitudinal axis of the inner tube. The outer tube 103 comprises an opening 104 with a cutting edge 105 at the wall of the outer tube 103 at the distal end of said outer tube 103. In this example, the opening 104 of the outer tube 103 is semi-circular; in particular the cutting edge 105 of the outer tube 103 is semi-circular. Alternatively, the opening 104 can be substantially circular. Alternatively, the cutting edge 105 can be also substantially circular. The inner tube 106 of the cutter 102 is in an extreme position characterized by the fact that the distal end of the inner tube 106 does not extend beyond the distal end of the outer tube 103, and therefore the cutting edges 108 of the inner tube 106 and the cutting edge 105 of the outer tube 103 form an angle α (shown in FIG. 6) with respect to one another by rotation of the inner tube 106. Preferably, the inner tube 106 is configured to create contact, i.e. form the angle α, between the cutting edges 105 of the outer tube 103 and at least one of the cutting edges 108 of the inner tube 106 at any time during the rotation of the inner tube 106. Expressed differently, the plurality of openings 107 with a plurality of cutting edges 108 at the wall of the inner tube 106 are preferably configured to create contact between the cutting edges 105 of the outer tube 103 and at least one of the cutting edges 108 of the inner tube 106 at any turning position of the inner tube with respect to the outer tube. Such configuration provides cutting conditions at any turning position, enabling a continuous cutting at any time during the rotation of the inner tube 106. It will be apparent to the skilled person, that the distance between the openings 107 in the inner tube 106 and/or the orientation of the cutting edges 108 can allow such a continuous cutting at any time of the rotation of the inner tube 106. Preferably, the openings 107 are arranged in such a way that at least two cutting edges 108 of the inner tube 106 form an angle α with respect to the cutting edge 105 of the outer tube 103. Therefore, the continuous cutting is achieved by two cuttings with every rotation of the inner tube 106. Preferably, the angle α is variable and is between 90° at the beginning of the cutting, when the cutting edge 108 of the inner tube 106 first contacts the cutting edge 105 of the outer tube 103, and 180° at the end of the cutting, when the cutting edge 108 of the inner tube 106 touches the last point of the cutting edge 105 of the outer tube 103, since the cutting follows the shape of the opening 104.

In a particular embodiment the cutting edges 108 of the plurality of openings 107 of the rotating inner tube 106 are parallelly spaced from one another in an oblique or slightly curved orientation, and the cutting edge 105 of the outer tube 103 is substantially (semi)-circular, wherein the openings 107 are arranged in such a way that at least two cutting edges 108 of the inner tube 106 form an angle α with respect to the cutting edge 105 of the outer tube 103. It has been observed that such a configuration provides the best result in cutting and fast aspiration of fibrous vitreous material as it is being pulled towards the aspiration passageway of the inner tube 106.

Preferably the inner tube 106 is removable. The vitrectomy device 100 comprises further a drive system 109 positioned within the housing 101, the drive system 109 coupled to the inner tube 106 and configured to rotate the inner tube 106. Preferably, the drive system 109 of the cutter 102 comprises a motor 110, a drive shaft 111 and a revolving cylinder 112. Preferably, the revolving cylinder 112 of the drive system 109 of the cutter 102 comprises multiple chambers 113, located symmetrically about its longitudinal axis. In this example the revolving cylinder 112 comprises four chambers 113, wherein one of said chambers 113 holds the inner tube 106. The revolving cylinder 112 may further comprise a vitrectomy tool selected for example from a flute needle, a soft tipped needle/retinal dyes/intra-ocular medication etc. The inner tube 106 may be replaced with this vitrectomy tool in the outer tube 103 to perform other surgical procedures. The motor 110 of the drive system 109 is for example selected from a pneumatically driven sterilizable air-motor with high-speed rotation of at least 80.000 rpm or an electric motor with high-speed rotation of at least 80.000 rpm. The plurality of cutting edges 108 of the inner tube 106 spaced from one another creates a variable aspiration space during rotation in the overlap between the opening 104 of the outer tube 103 and the openings 107 of the inner tube 106. This configuration of the respective location of the cutting edges of the inner and the outer tubes allows the vitrectomy device 100 to have a continuous open aspiration port. The variable open surface of the opening 104 is between 50-150% of a diameter of the outer tube 103. At the inside, the inner tube 106 is an aspiration passageway arranged to aspirate tissue from the eye.

Figure 6:
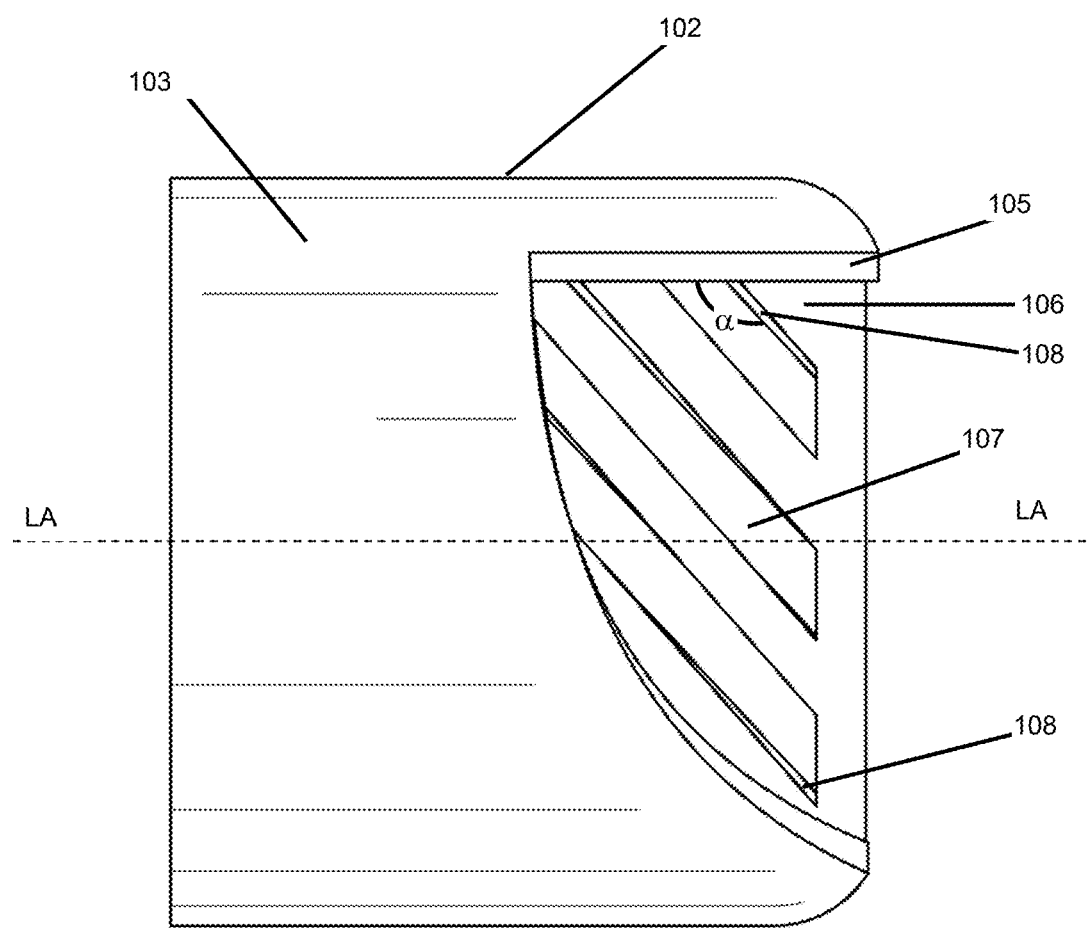
FIG. 6 shows a detailed side view of a distal end of a cutter, according to an embodiment of the present invention.

We now refer to FIG. 6, showing a detailed side view of a distal end of a cutter 102, according to an embodiment of the present invention. This figure clearly shows that the inner tube 106 comprises a plurality of openings 107 with a plurality of cutting edges 108 at the wall of the inner tube 106 at the distal end of said inner tube 106 and that the plurality of the cutting edges 108 of the opening 107 of the rotating inner tube 106 is oblique with respect to the longitudinal axis of the inner tube. The cutting edges 108 of the inner tube 106 and the cutting edge 105 of the outer tube 103 form an angle α with respect to one another by rotation of the inner tube 106.

The method of a vitrectomy using a vitrectomy device 100 is carried out as follows. The vitrectomy device 100 inserts into a vitreous cavity of the eye. A drive system of the cutter 102 of the vitrectomy device 100 turns on to rotate the inner tube 106 of the cutter 102 of the vitrectomy device. The vitreous material is cut by the cutter 102 and then is removed from said vitreous cavity by aspiration. The cutting is achieved by an angle α formed between the cutting edges 108 of the inner tube 106 and the cutting edge 105 of the outer tube 103.

LIST OF FEATURES

| Number | Feature |
| --- | --- |
| 100 | vitrectomy device |
| 101 | housing |
| 102 | cutter |
| 103 | outer tube |
| 104 | Opening of the outer tube |
| 105 | cutting edge of the opening of the outer tube |
| 106 | inner tube |
| 107 | Opening of the inner tube |
| 108 | cutting edge of the opening of the inner tube |
| 109 | drive system |
| 110 | motor |
| 111 | drive shaft |
| 112 | revolving cylinder |
| 113 | Chamber of the revolving cylinder |
| 114 | Distal portion of the housing |
| 115 | Cut of the vitreous material |
| 116 | grain (fiber) of the vitreous material |
| LA | longitudinal axis |
| α | an angle between the cutting edge 108 of the inner tube 106 and the cutting edge 105 of the outer tube 103 |

The invention claimed is:
1. A vitrectomy device comprising:
a housing;
a cutter comprising:
an outer tube coupled to the housing, the outer tube having an opening on a wall at a distal end of the outer tube;

an inner tube disposed within the outer tube, the inner tube being rotatable about a longitudinal axis of the inner tube; and a drive system positioned within the housing and configured to rotate the inner tube, wherein:

the opening on the wall at the distal end of the outer tube comprises a cutting edge;

the inner tube comprises a plurality of openings with a plurality of cutting edges at a wall of the inner tube at a distal end of the inner tube;

the cutting edges of the inner tube and the cutting edge of the outer tube are configured to form an angle with respect to one another by rotation of the inner tube;

the inner tube is closed at the distal end of the inner tube; and the outer tube is completely open at the distal end of the outer tube.

2. The vitrectomy device of claim 1, wherein the plurality of openings comprising the plurality of cutting edges of the inner tube are spaced from one another, configured to create a variable open surface of opening during rotation in an overlap between the opening of the outer tube and the plurality of openings of the inner tube.

3. The vitrectomy device of claim 2, wherein the inner tube is configured to create contact between the cutting edge of the outer tube and at least one of the cutting edges of the inner tube at any time during the rotation of the inner tube.

4. The vitrectomy device of claim 2, wherein the variable open surface of opening is from 50% to 150% of a diameter of the outer tube.

5. The vitrectomy device of claim 1, wherein the drive system of the cutter comprises a motor, a drive shaft, and a revolving cylinder.

6. The vitrectomy device of claim 5, wherein the revolving cylinder of the drive system of the cutter comprises multiple chambers, wherein at least one of the chambers holds the inner tube.

7. The vitrectomy device of claim 6, wherein the revolving cylinder further comprises a vitrectomy tool selected from a flute needle, a soft tipped needle, retinal dyes, or intra-ocular medication.

8. The vitrectomy device of claim 5, wherein the motor is selected from a pneumatically driven sterilizable-air motor with high-speed rotation of at least 80,000 rpm or an electric motor with high-speed rotation of at least 80,000 rpm.

9. The vitrectomy device of claim 1, wherein the inner tube is removable.

10. The vitrectomy device of claim 1, wherein at least one cutting edge of the opening of the rotating inner tube is vertical.

11. The vitrectomy device of claim 1, wherein at least one cutting edge of the opening of the rotating inner tube is oblique.

12. The vitrectomy device of claim 1, wherein the opening of the outer tube is substantially semicircular.

13. The vitrectomy device of claim 1, wherein the cutting edge of the outer tube is substantially semicircular.

14. The vitrectomy device of claim 1, wherein the inner tube is an aspiration passageway arranged to aspirate tissue from the eye.

15. A method of performing a vitrectomy on an eye using a vitrectomy device according to claim 1, the method comprising:

inserting the vitrectomy device into a vitreous cavity of the eye;

activating the drive system of the cutter of the vitrectomy device to rotate the inner tube of the cutter of the vitrectomy device;

cutting the vitreous material by the cutter; and removing vitreous material from said vitreous cavity by aspiration, wherein:

the cutting is achieved by the angle formed between the cutting edges of the inner tube and the cutting edge of the outer tube.

16. The method of claim 15, wherein the plurality of cutting edges of the inner tube are spaced from one another, creating a variable aspiration space during rotation in the overlap between the opening of the outer tube and at least one opening of the inner tube.

* * * * *